United States Patent
Zerrouk et al.

(10) Patent No.: US 9,076,359 B2
(45) Date of Patent: Jul. 7, 2015

(54) WIDE VIEW 3D TELEVISION SYSTEM

(75) Inventors: Abdelmounaime Faouzi Zerrouk, Singapore (SG); Emine Goulanian, Richmond (CA)

(73) Assignee: Zecotek Display Systems Ltd Pte

( * ) Notice: Subject to any disclaimer, the term of this patent is extended or adjusted under 35 U.S.C. 154(b) by 0 days.

(21) Appl. No.: 13/108,249

(22) Filed: May 16, 2011

(65) Prior Publication Data
US 2011/0234770 A1    Sep. 29, 2011

Related U.S. Application Data

(63) Continuation of application No. 11/364,692, filed on Feb. 27, 2006, now Pat. No. 7,944,465.

(60) Provisional application No. 60/758,747, filed on Jan. 13, 2006.

(51) Int. Cl.
*H04N 13/04* (2006.01)
*G09G 3/00* (2006.01)

(52) U.S. Cl.
CPC .......... *G09G 3/003* (2013.01); *H04N 13/0404* (2013.01); *H04N 13/042* (2013.01); *H04N 13/0422* (2013.01); *H04N 13/0443* (2013.01); *H04N 13/0497* (2013.01)

(58) Field of Classification Search
CPC ................ H04N 13/0404; H04N 13/0411
USPC .......................................................... 348/51
See application file for complete search history.

(56) References Cited

U.S. PATENT DOCUMENTS

| | | |
|---|---|---|
| 2,198,678 A | 4/1940 | Noaillon |
| 3,632,866 A | 1/1972 | King |
| 3,932,699 A | 1/1976 | Tripp |
| 4,160,973 A | 7/1979 | Berlin, Jr. |
| 5,132,839 A | 7/1992 | Travis |
| 5,581,378 A | 12/1996 | Kulick et al. |
| 5,712,732 A * | 1/1998 | Street ........................... 359/630 |
| 5,742,332 A | 4/1998 | Imai et al. |
| 5,745,197 A | 4/1998 | Leung |
| 5,930,037 A | 7/1999 | Imai |
| 6,268,881 B1 | 7/2001 | Muramoto |
| 6,337,721 B1 | 1/2002 | Hamagishi et al. |
| 6,476,850 B1 | 11/2002 | Erbey |
| 6,487,020 B1 | 11/2002 | Favalora |
| 6,533,420 B1 | 3/2003 | Eichenlaub |
| 7,064,895 B2 * | 6/2006 | Morishima et al. ........... 359/463 |
| 2003/0076281 A1 | 4/2003 | Morgan et al. |
| 2004/0189970 A1* | 9/2004 | Takada ............................. 355/67 |
| 2006/0092158 A1 | 5/2006 | Shestak |

* cited by examiner

*Primary Examiner* — Richard Torrente
(74) *Attorney, Agent, or Firm* — Thomas E. Loop

(57) ABSTRACT

This invention relates to a multiview 3-dimensional display for sequentially projecting high number of 2-dimensional images of aspect angles of objects (scenes) into the wide field of view (apparatus) for producing their 3-dimensional images. The 3D image is perceived with great depth, provides comfortable conditions for its viewing without eye strain. The viewing of such 3D image also does not require using any supplementary means such as glasses or tracking devices, does not limit the position of the viewer in the field of view. This allows viewing the 3D image by many viewers simultaneously. The 3D display of the present invention can be used in computer and TV systems for transforming 2-dimensional images of aspect angles of virtual and real, static and moving 3D objects into corresponding signals and transmitting said signals for reproducing 2-dimensional by 3D display.

15 Claims, 12 Drawing Sheets

WIDE VIEW 3D TELEVISION SYSTEM

CROSS-REFERENCE TO RELATED APPLICATIONS

This application is a continuation of U.S. application Ser. No. 11/364,692 (pending) filed on Feb. 27, 2006, which application claims the benefit of U.S. Provisional Application No. 60/758,747 filed on Jan. 13, 2006, which applications are all incorporated herein by reference in their entireties for all purposes.

TECHNICAL FIELD

The present invention relates generally to optical-electronic technology and, more specifically, to optical-electrical apparatuses and systems for reproducing 3-dimensional images, as well as for recording and transmitting 3-dimensional stereo representations of static and moving objects.

BACKGROUND OF THE INVENTION

Building equipment for viewing 3-dimensional (volumetric and, in particular, stereo) representations is an entirely appealing and achievable task. Such equipment can have very wide application both in fields of science, in engineering development, in industrial production, in medicine, as well as in computer systems, advertising, show business, design, simulators and gaming equipment, and in movie and television technology. This last field is particularly attractive in view of its wide dispersion and societal demand. It is significant in this regard, that for effective and wide use of the technology of 3-dimensional (volumetric) TV, principles must be developed for construction not only of 3-dimensional display equipment, but also for suitable technology for transmitting equipment.

The capacity for 3-dimensional vision is inherent in humans. It is therefore natural that inventors have long sought methods and equipment for representation and display of 3-dimensional objects. More than 150 years ago studies were already being conducted on binocular vision and experience was gained in construction of stereoscopic devices (Charles Whearstone, Contributions to the physiology of vision.-Part the first. On some remarkable, and hitherto unobserved, phenomena of binocular vision. Philosophical Transactions of the Royal Society of London 1838). From that time, and especially recently, a great number of inventions have been registered in this field. These take many directions and employ different principles for construction of equipment and in their approach to the task. One of these directions is use of "auto-stereoscopic" methods and equipment using the "principles of 3-dimensional vision without glasses" (Selected Papers on Three-Dimensional Displays. Editor Stephen A. Benton. Introduction. SPIE Milestone Series, Vol. MS 162, Stephen A. Benton. Autostereoscopy becomes holography: historical connections. Three-Dimensional Video and Display: Devices and Systems. Proceedings of a conference held. November 2000, Boston, Mass., pp. 154-167). There is also the possibility of reproduction of both static displays and moving scenes (objects).

In turn, within this direction it is possible to distinguish a few fundamental approaches. A number of systems have been built on the principle of the existence of special (discrete, fixed) spatial zones to which the right and left eyes of the viewer must be directed in order to realize a stereoscopic effect. In these systems there can be only two zones (U.S. Pat. No. 6,268,881, 2001) or more (U.S. Pat. No. 6,476,850, 2002, U.S. Pat. No. 6,533,420, 2003). However with these systems there continually arises the problem of tracking, that is, the necessity of fixing the position of the eyes (and head) of the viewer in order to direct vision to these zones. This is a major inconvenience and limits acceptance of such equipment.

One variant for solution of this problem is the use of various systems for automatic tracking of the position of the eyes (or head) of the viewer and alignment of the zones themselves, or the use of supplementary equipment to facilitate correction of the position of the viewer himself (U.S. Pat. No. 5,742,332, 1998, U.S. Pat. No. 5,712,732, 1998, U.S. Pat. No. 6,337,721, 2002, U.S. Pat. No. 5,930,037, 1999). Such systems, besides the necessity of employing a relatively complex tracking mechanism, are not intended for simultaneous use by multiple viewers.

There are a number of systems, also called "volumetric" displays, in which a volumetric (3-dimensional) representation is reproduced either using displacement of a 2-dimensional screen in the distance (U.S. Pat. No. 2,198,678, 1940) or its rotation with respect to the vertical axis (U.S. Pat. No. 4,160,973, 1979, U.S. Pat. No. 6,487,020, 2002), or using a large-scale multilayer display (U.S. Pat. No. 5,745,197, 1998), or by focusing illumination on a dispersing medium (U.S. Pat. No. 3,632,866, 1972). The main and most significant defect of such systems is that they do not facilitate a "shading effect" (Selected Papers on Three-Dimensional Displays. Editor Stephen A. Benton. Introduction. SPIE Milestone Series, Vol. MS 162). In addition, in those variants using mechanical displacement of screens (back-and-forth in the "distance" or rotational), producing systems with large screens is technologically unrealistic.

Systems are also known, in which matrices of spatial light modulators (SLMs) are joined to matrices of micro-lenses (or holographic optical elements) (U.S. Pat. No. 5,581,378, 1996). However, each element of the optical matrix must contain a large number of SLM elements (and each element of the optical matrix must be joined to a large number of STLM elements). Because of this, it is possible to show simultaneously the majority of aspects and to produce a representation of a 3-dimensional object. However the practical value of such a display can only be realized through the use of SLMs, which would require thousands of additional elements compared to SLMs developed at the present time. However, existing technology is still not sufficient for realization of these parameters.

There is also a system in which the aspects of 3-dimensional representation are shown sequentially using fast-moving SLMs, which for display of each aspect is illuminated at various (corresponding) angles (U.S. Pat. No. 5,132,839, 1992). The main, and at present unresolved, problem significantly limiting the practical use of this technical solution is the absence of STLMs capable of rapid movement and of sufficiently large dimensions (only systems the size of a micro-display exist).

The majority of stereo (3-dimensional) displays described above can also be used to show stereo TV programs, but with significant limitations, which are the result of the defects mentioned above. In addition, these systems lack corresponding systems for display and transmission of stereo representation of 3-dimensional objects.

However, there is a system for 3-dimensional television that includes both a 3-dimensional display and a working system for display and transmission of stereo representation of 3-dimensional objects. Based on a series of significant indicators, this patent is closest to the proposed invention and is taken as a prototype (U.S. Pat. No. 3,932,699, 1976).

In this system the illumination (light) from the 3-dimensional scene is directed, using a converging lens (objective), to a matrix of micro-lenses and, passing through the matrix, it strikes a photo-detection system (television transmitting camera). The matrix of micro-lenses, in this case, is a lenticular array, consisting of a large number of vertically aligned cylindrical lenses. Such a matrix discriminates (spatially) the illumination from various aspects of the object and brings into focus each element of the representation of various aspects on various corresponding parts in the plane of focus in which is located the photo-detection surface (the transmitting television camera). In this way, all possible representations of the aspects of a 3-dimensional object in this optical system, digitized and spatially arranged in relation to each other, are simultaneously projected on the photo-detection equipment. Electrical signals, corresponding to the location of various elements of the representation of the aspects, are received in the photo-detection equipment as usual and are transmitted through a communications channel to the receiving equipment—a 3-dimensional stereo display. The 3-dimensional stereo display, including a normal (2-dimensional) TV display (monitor), reproduces elements of the representation's aspects. Then the illumination from these elements passes to a different matrix of micro-lenses on the surface of the monitor, and then to a different matrix of micro-lenses in the transmitting equipment. Elements of the matrix used in the display are arranged in a similar manner with respect to the picture reproduced by the monitor and direct their illumination to the viewer at various angles corresponding to the various aspects of the 3-dimensional object (scene).

Regarding a system using a component for producing a stereoscopic representation, this well-known technical solution (U.S. Pat. No. 3,932,699, 1976) can also be seen as a prototype.

This prototype has the following defects:

Both the photo-detecting transmitting camera and the display monitor require a large number of elements (a large computing capacity) in order to display a sufficiently high-quality 3-dimensional representation at acceptable viewing angles, that is, to provide comfortable conditions for viewers. Thus, at the usual resolution for TV (no less than 500 elements per line) in order to present a 3-dimensional representation with acceptably high quality at an angle of about 20 degrees, the camera and, correspondingly, the monitor, must contain more than 50,000 horizontal elements, which is unrealistic given the present state of technology in this field.

To provide a quality reproduction of a volumetric stereo representation on a 3-dimensional display, it is necessary that the elements comprising the 2-dimensional component of the display be very precisely placed with respect to the elements of the micro-lens matrix, which is a complex technological problem considering the unavoidable distortion of images (mainly of scale) in present-day equipment.

The task of the invention is the design of equipment for transmission and display of representations of 3-dimensional objects (scenes), both static and moving, which provides comfortable viewing conditions (perception): which, in order to produce the desired perception, does not require the use by the viewer of either supplementary means such as special glasses or tracking devices, which does not drastically constrain the position of the viewer with respect to the display, and which facilitates viewing of the 3-dimensional representation simultaneously by multiple viewers in a sufficiently wide field of view. In addition, such equipment must be scalable—it must be possible to manufacture displays (screens) of both small and large (for a large number of viewers) dimensions, and they must use simple and complex components that are presently in production and available. It is also important to minimize the dimensions and mass of the equipment.

BRIEF DESCRIPTION OF THE DRAWINGS

The drawings are intended to be illustrative and symbolic representations of certain exemplary embodiments of the present invention and as such, they are not necessarily drawn to scale. Like reference numerals are used to designate like features throughout the several views of the drawings.

The invention is illustrated by drawings, where.

SUMMARY OF THE INVENTION

Figure 1:
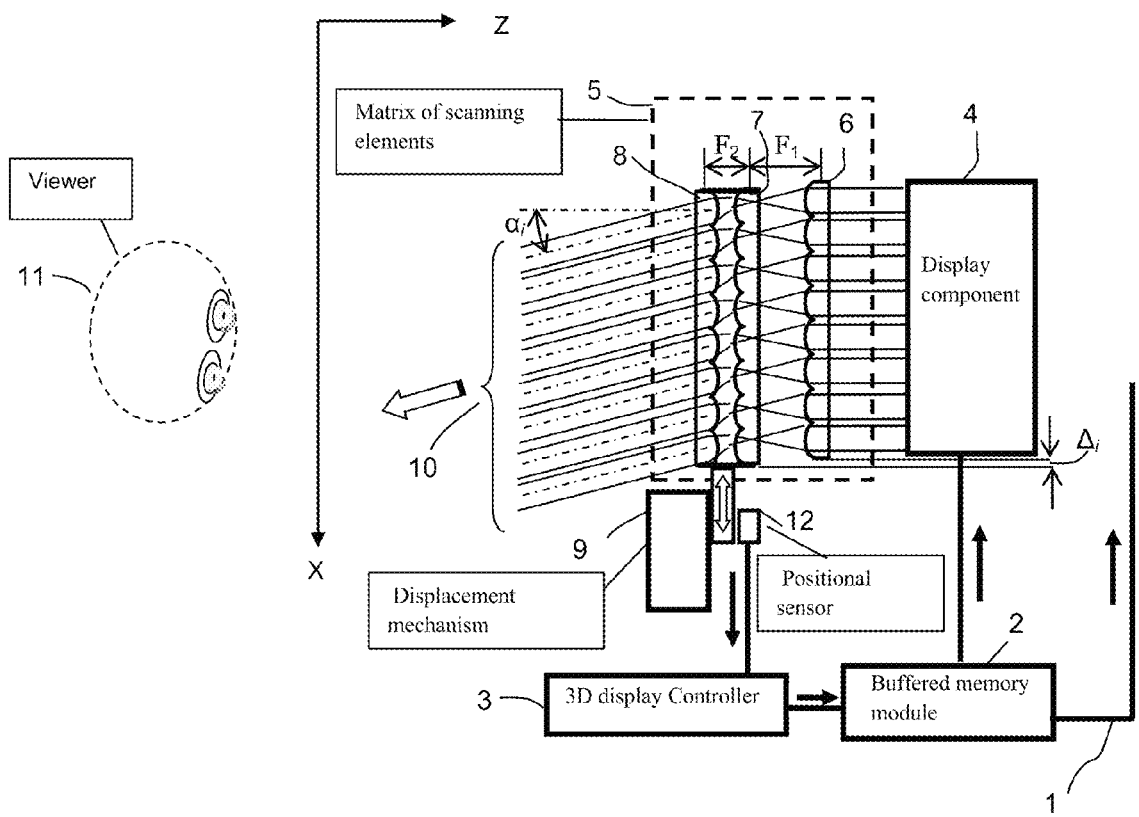
FIG. 1 shows the principal diagram of an apparatus for reproducing 3-dimensional images.

This invention is intended for construction (development) of equipment for reproduction of static and moving (live) 3-dimensional stereo representations (3-dimensional display) and equipment capable of recording and transmitting stereo representations of 3-dimensional objects (scenes). This includes the task of producing equipment that provides to the user comfortable conditions of viewing a volumetric representation. These conditions should not require use of any supplementary means such as glasses, should not drastically limit the position of the viewer with respect to the display, and should allow simultaneous viewing of the 3-dimensional display by many viewers from a sufficiently wide field of view.

Another requirement is construction of relatively compact equipment, for which it is possible to use elements and compound components that are presently in production and available.

This invention can be used for building 3-dimensional displays for computers, television (TV) receivers and other equipment, used for demonstration of 3-dimensional stereo representation of virtual and real, static and moving objects and, in particular, in volumetric TV systems. This invention can be used for building 3-dimensional displays for computers, television (TV) receivers and other equipment, used for demonstration of 3-dimensional stereo representation of virtual and real, static and moving objects and, in particular, in volumetric TV systems. This invention also concerns equipment for producing 2-dimensional pictures of 3-dimensional representations of real, static and moving objects, their transformation into electrical signals, and/or saving and transmitting them for viewing on a 3-dimensional display.

The technical result achieved by the invention consists of increasing the number of aspects with relatively simple construction and with the use of presently available components.

In another aspect, the present invention is directed to an optical-electrical apparatus for reproducing a 3-dimensional image of an object or scene, comprising: a display component for displaying a plurality of 2-dimensional images of the object or scene, the display component having a display surface and at least one input; a first matrix of converging micro-lenses, wherein each micro-lense is optically coupled to a discrete region of the display surface; a second matrix of converging micro-lenses optically coupled to the first matrix; a third matrix of converging micro-lenses coaxially aligned and rigidly connected to the second matrix such that the second matrix is positioned in the primary focal plane of the third matrix, and such that the primary focal plane of the third matrix is matched with the back focal plane of the first matrix, and wherein the first, second, and third matrices in combination define a matrix of scanning elements configured to sequentially project the plurality of 2-dimensional images of the object or scene, and wherein each 2-dimensional image is projected at a specific angle relative to the scanning matrix; a displacement mechanism for continuously moving the position of the first matrix relative to the second and third matrices; a positional sensor for sensing the position of the first matrix relative to the second and third matrices; a controller connected to the positional sensor, wherein the controller is configured to synchronize the position of the first matrix relative to the second and third matrices and with each of the sequentially projected 2-dimensional image of the object or scene; and a memory component connected to the controller and the display component, wherein the memory is configured to store data associated with the position of the first matrix relative to the second and third matrices and with the sequentially projected 2-dimensional image of the object or scene.

These and other aspects of the present invention will become more evident upon reference to the following detailed description and attached drawings. It is to be understood, however, that various changes, alterations, and substitutions may be made to the specific embodiments disclosed herein without departing from their essential spirit and scope. In addition, it is to be further understood that the drawings are intended to be illustrative and symbolic representations of certain exemplary embodiments of the present invention and as such they are not necessarily drawn to scale. Finally, it is expressly provided that all of the various references cited herein are incorporated herein by reference in their entireties for all purposes.

DETAILED DESCRIPTION OF THE INVENTION

The essence of the invention consists in achieving the above-mentioned technical result in equipment to present a 3-dimensional representation, which contains a component for transformation of a 2-dimensional representation with digital inputs, an initial 2-dimensional matrix of collecting micro-lenses, in which each micro-lens is optically joined to the corresponding area of the display surface of the equipment for 2-dimensional representation, second and third 2-dimensional matrices of micro-lenses, tightly joined in a one-to-one fashion, which in turn are coaxially aligned and optically joined to the micro-lenses of the first positioning matrix, forming along with the first matrix a matrix of scanning elements for later projection of 2-dimensional representations in their aspect angles, and a mechanism for adjusting the matrices of micro-lenses, a positional sensor for the micro-lenses and a controller, connected to the adjusting mechanism by a digital input, equipped with the ability to synchronize display of each frame of the 2-dimensional representation with the corresponding position of the matrix of micro-lenses; the second matrix is positioned on the foreground focal plane of the third matrix, which [third matrix] is combined with the background focal surface of the first matrix, the first matrix or the combined second and third matrices can be adjusted in the plane of their component, and the digital input of the display equipment is connected to a block of buffered memory whose synchronization input is connected to the controller output.

The 2-dimensional display component contains at least one spatial light modulator (SLM) and one light source for illuminating the corresponding modulator.

For projection of colored representations of an object, the display equipment contains at least two controlling light sources of different colors for illumination of the space-time light modulator by an optical component that mixes their light, and a control component providing the capability to switch the light sources depending on the color of the image of the aspect angles. Each output of the control component is connected to the control input of the corresponding light source, and the synchronization input is connected to the output of the controller.

For projection of colored representations of an object, the display equipment can contain at least two light sources of different colors, each for illumination of the corresponding space-time light modulator, which are optically joined to the first matrix of micro-lenses by an optical component for mixing the light, and by digital inputs of each modulator connected to the corresponding digital outputs of a block of buffered memory.

Equipment for display of 2-dimensional representations can be constructed as an LED matrix or as a laser diode matrix.

The adjustment mechanism of the matrices is constructed as a 2-coordinate mechanism for back-and forth adjustment.

For projection of a 2-dimensional representation of all aspect angles of an object consisting of a single frame of its 3-dimensional representation, the amplitude of adjustment for each coordinate does not exceed the corresponding spacing of the micro-lenses.

To change the scale of a 2-dimensional representation, the first matrix of micro-lenses is optically joined to the display surface of the equipment by the first telescopic optical system.

The first telescopic optical system consists of a spatial filter with integrated focus of its elements.

The first, second and third matrices of micro-lenses are each constructed as a lenticular matrix of cylindrical, vertically aligned lenses. The adjustment mechanism is constructed as a back-and-forth horizontal adjustment mechanism for the first matrix of micro-lenses, and as a single back-and-forth horizontal adjustment mechanism for the combined second and third matrices of micro-lenses.

The first matrix is constructed with the same spacing between micro-lenses as the second and third matrices.

The first, second, and third matrices are constructed of identical micro-lenses.

Each micro-lens of the first matrix is optically joined to the corresponding region of the display surface of the equipment using the corresponding fiber of the first fiber-optic matrix.

This technical result is achieved in a stereoscopic television system, which includes a component for composing a 3-dimensional representation, a component for transformation of 2-dimensional representations with digital inputs, a first 2-dimensional matrix of collecting micro-lenses, in which each micro-lens is optically joined to the corresponding region of the display surface of the component for transformation of 2-dimensional representations, a module for composing [digital] signals of 2-dimensional representations, digital outputs connected to the digital inputs of the component for composing stereoscopic representations and containing a 2-dimensional receiving matrix of collecting lenses, analogous in number and position to the first matrix of micro-lenses, an objective collecting lens for projecting the representation of a 3-dimensional object on the receiving matrix of micro-lenses, and at least one multi-element matrix photo-detection component for transformation of 2-dimensional representations of the aspect angles of a 3-dimensional object into the appropriate electrical signals, and whose outputs provide digital representation of the 2-dimensional representation. Moreover, the component for display of stereoscopic representation is equipped with interconnected second and third 2-dimensional matrices of micro-lenses, coaxially aligned and optically joined to the micro-lenses of the first matrix, forming along with the first matrix scanning elements for sequential projection of 2-dimensional representations in the direction of their aspect angles, a first mechanism for adjusting the matrices of micro-lenses, a first positional sensor for the adjusted micro-lenses, and a controller connected by a digital input to the positional sensor, providing the ability to synchronize display of each frame of the 2-dimensional representation with the corresponding position of the matrix of micro-lenses. In this case, the second matrix is positioned on the foreground focal plane of the third matrix, which [third matrix] is combined with the background focal plane of the first matrix. The first matrix or the combined second and third matrices can be adjusted in the plane of their component. Moreover, the digital input of the display component is connected to the digital input of the input of the component for display of stereoscopic representation by a module of buffered memory whose synchronization input is connected to the controller output, and the module for digitization of 2-dimensional representations is equipped with fourth and fifth 2-dimensional matrices of micro-lenses with a multi-element spatial filter forming, in conjunction with the receiving matrix, a matrix of elements for tuning 2-dimensional representations of the aspect angles of the 3-dimensional representation of an object. In this case the fourth matrix is tightly joined to the receiving matrix and positioned in its background focal plane. The multi-element spatial filter is tightly joined to the fifth matrix, positioned in its foreground focal plane, and adjoins the fourth matrix. The fifth matrix, jointly with the spatial filter, or the receiving matrix, jointly with the fourth matrix, can be adjusted in their respective planes to change their relative position to each other, and each adjusting element includes the corresponding element of the spatial filter, and the micro-lenses of the receiving, fourth, and fifth Matrices. A micro-lens of the fourth matrix is coaxially aligned with a micro-lens of the receiving matrix and optically joined to the appropriate element of the spatial filter, which [element] is located in the axis of the indicated micro-lens of the fifth matrix, [said micro-lens being] joined to the appropriate region of the photosensitive surface of the photo-detecting component for projection of the appropriate part of the 2-dimensional representation of the aspect angle. The second adjustment mechanism of the indicated matrices, the second positional sensor of the combined matrices, and the synchronization controller for the display module adjust the 2-dimensional representation with respect to the corresponding position of the combined matrices. Moreover the digital input of the controller is connected to the output of the second positional sensor, and the input—with the synchronization of the photo-detection component.

The 2-dimensional display component contains at least one spatial light modulator and at least one light source for illumination of the modulator.

For projection of color representations of an object the display component can contain at least two controlling light sources of different colors for illumination of the space-time light modulator using an optical component for mixing of their rays and a control component providing the capability to switch the light sources depending on the color of the image of the aspect angles. Each output of the control component is connected to a control input of the corresponding light source, and the synchronization input is connected to the output of the controller.

For projections of colored representations of an object, the display equipment can contain at least two light sources of different colors, each for illumination of the corresponding space-time light modulator, which are optically joined to the first matrix of micro-lenses by an optical component for mixing the light, and by digital inputs of each modulator connected to the corresponding digital outputs of the block of buffered memory.

Equipment for display of 2-dimensional representations can be constructed as an LED matrix or as a laser diode matrix.

The first mechanism is constructed as a 2-coordinate mechanism for back-and forth adjustment of the matrices of micro-lenses.

For projection of a 2-dimensional representation of all aspect angles of an object, consisting of a single frame of its 3-dimensional representation, the amplitude of adjustment for each coordinate does not exceed the corresponding spacing of the micro-lenses.

To change the scale of a 2-dimensional representation, the first matrix of micro-lenses is optically joined to the display surface of the equipment by the first telescopic optical system.

The first telescopic optical system consists of a spatial filter with integrated focus of its elements.

The first, second and third matrices of micro-lenses are each constructed as a lenticular matrix of cylindrical, vertically aligned lenses. The first adjustment mechanism is constructed as a back-and-forth horizontal adjustment mechanism for the first matrix of micro-lenses, or as a back-and-forth horizontal adjustment mechanism for the combined second and third matrices of micro-lenses.

The first matrix is constructed with the same spacing between micro-lenses as the second and third matrices.

The first, second, and third matrices are constructed of identical micro-lenses.

Each micro-lens of the first matrix is optically joined to the corresponding region of the display surface of the equipment using the corresponding fiber of the first fiber-optic matrix.

The digital outputs of the component for producing the signals [digital representation] of the 2-dimensional representation are connected to the outputs for 3-dimensional stereoscopic display by a communications channel.

The component for producing the signals of the 2-dimensional representation contains at least two multi-element arrays of photo-detection equipment, and each photo-detection component serves to transform a 2-dimensional representation of the aspect angles of a 3-dimensional object of the corresponding color, and its photosensitive surface is optically joined to the fifth matrix through an optical splitter and a color light filter of the given color.

The fifth matrix of micro-lenses is optically joined to the photosensitive surface of the photo-detection equipment through a second telescopic optical system for changing the scale of the 2-dimensional representation.

Each micro-lens of the fifth matrix is optically joined to the corresponding section of the photosensitive surface of the photo-detection equipment using the corresponding fiber of the second fiber-optic matrix.

The multi-element matrix spatial filter is constructed as an opaque screen with holes, each of which is positioned in the axis of the corresponding micro-lens of the fifth matrix.

Thanks to the use of a system of three coupled matrices of micro-lenses, which can be adjusted with respect to each other, it is possible to spatially differentiate (scan) a large number of representations of the aspect angles of a 3-dimensional object and direct the illumination of these aspect angles in the appropriate directions.

In addition, thanks to the use of buffered memory, the component with a positional sensor of the matrices, controller, and device for adjustment of the matrices provides the ability to display the aspect angles sequentially in time with the necessary frequency, and thus facilitates temporal scanning of the aspect angles, which in turn allows display of a moving object, as well as the use of a display device with a minimum number of elements, that is, with a number of elements equal to the number of elements in the representation of a single aspect angle, and not depending on the number of aspect angles.

Also, these features provide comfortable viewing conditions for several viewers of a stereo picture of a 3-dimensional object without noticeable discontinuity of the aspect angles and in an acceptably wide viewing angle, and without use of either supplementary equipment such as glasses or systems to track the position of the eyes (or head) of the viewer.

Use in the display, for the component to display the 2-dimensional data of the SLMs, of matrices of LEDs or lasers, provides optimization, depending on the application, of the technological parameters, in particular, the brightness of the representation, the dimensions of the display and its energy requirements.

Use of optical mixers and a number of components working in parallel to display the image provides the ability to display color representations, allowing an improvement in the quality of the display of objects and in the comfort provided to viewers.

Use in the display of the device for back-and-forth adjustment of the matrices with amplitudinal adjustment no larger that the spacing of the micro-lenses of the matrices simplifies the mechanical construction (the screen) of the display and decreases its dimensions and mass.

The telescopic optical system allows us to join the necessary characteristics of small-scale equipment for presenting representations of aspect angles, in particular the SLMs, with screens (in this case matrices of micro-lenses) of large dimensions, and thus solve the problem of scaling the dimensions of the display.

The spatial filter, implemented in common with a telescopic optical system, allows us to smooth out the digital structure of the representation of an aspect angle, to significantly simplify the adjustment of the representation of the angle with respect to the matrices of micro-lenses and improve the quality of the presented picture through elimination of interference in the form of a moire picture, which would result if there was not an exact concurrence between the elements in the representation of the aspect angles and the spacing of the micro-lens matrices.

Use of matrices of micro-lenses with identical parameters, and of lenticular matrices, simplifies construction of the equipment and its tuning.

Use of a fiber-optic matrix provides the basis for screens for large-scale displays, and at the same time for minimization of the dimensions of the equipment.

Use in a television stereoscopic system of joined supplementary matrices of micro-lenses and a matrix spatial filter, which can be adjusted with respect to each other, allows us to spatially separate and sequentially extract individual 2-dimensional representations of aspect angles and direct them to the photo-detector, which must have a resolution (number of elements or pixels) corresponding to the resolution of at least one representation of an aspect angle of a 3-dimensional object, but not the sum of pixels—elements of all aspect angles, as in the prototype. Also, in contrast to the prototype, this allows for use of a common matrix photo-detection device (photo-transformer) and provides the required characteristics (parameters) of the data for 2-dimensional pictures of aspect angles suitable for use in a 3-dimensional display.

Use of optical tuners and a few photo-detection components and color light filters allows us to display and transmit signals of color representations, which enables us to use a color stereo display.

The telescopic optical system, joined to the matrices of micro-lenses and the photo-detector, allows us to compose and easily tune a matrix of micro-lenses and the matrix photo-detector, which have different scales.

Use of a fiber-optic matrix, joined to the matrices of micro-lenses and the photo-detector, allows us to optically align the matrix of micro-lenses and the matrix photo-detector, which have different scales, as well as to decrease the dimensions of all equipment.

In this way, the sum of the optical characteristics allows us to achieve in this invention the observed technical results, which cannot be achieved in the prototype or in other analogous devices.

An effective solution to the problem of producing a 3-dimensional stereo display, intended for comfortable use by one or more viewers, in large part depends on the use of presently available components. Since the display of 3-dimensional pictures requires the use and modification of a stream of digital data many (hundreds or thousands) times larger than for display of common 2-dimensional pictures (for example, on a computer screen or television set), it is necessary to use high-performance matrix components for the transformation of electric signals into light. Other known patents propose to use either matrix space-time light modulators or a matrix of LEDs or laser diodes for volumetric displays. However, a component with either a very large number of elements (pixels) (at least in the tens of pixels) with low frequency (as used, for example, in TV technology), or a component with a normal number of elements in the display image (for example, in PC monitors or TVs), but at high frequencies (greater than a kHz) might be useful in these applications. As mentioned above, while a variant with a large number of pixels is unrealistic at the present time, equipment corresponding to the parameters of the second type functioning as high-speed micro-displays already exists and is in use today. Production of high-speed and high-performance displays (display equipment) of large dimensions at the present time has not been perfected, since this presents significant technical difficulties.

One of the main tasks solved in this invention is construction of volumetric stereo displays of large dimensions, specifically with a large screen, on the basis of presently available high-speed micro-displays.

In the case of the use of high-speed SLMs (or, for example, matrices of light or laser diodes), 2-dimensional pictures of the aspect angles of a 3-dimensional object (stereo representation) must be reproduced sequentially in time, or in other words, scanned in time, and moreover the frequency of their appearance and the intensity must be such as to ensure a unified picture of a moving object. (Thus, for example, with the number of aspect angles equal to 100, the acceptable frequency for change of the aspect angles is equal to about 2.5 kHz). However, besides providing the necessary frequency for displaying pictures of aspect angles, it is necessary to provide reproduction of a sufficiently large number of aspect angles and to scan these angles (i.e., carry out spatial scanning) over a sufficiently wide angle, at which the representation of the 3-dimensional object is visible.

This invention proposes a solution to the presented problems through the use of a high-speed display of 2-dimensional data and through application of a specialized optical arrangement.

Equipment for display of a 3-dimensional representation (3-dimensional stereo display) includes a communications channel (data flow) 1, connected to a buffered memory module 2, its connected controller 3, and a display component 4 for 2-dimensional representations connected to buffered memory module 2, before which is placed a matrix 5 of scanning elements, which is composed of sequentially positioned: first 2-dimensional matrix 6 of collecting micro-lenses, second 2-dimensional matrix 7 of micro-lenses and third 2-dimensional matrix 8 of micro-lenses. The matrices are positioned in XY planes perpendicular to the Z direction. The equipment also contains a mechanism 9 for back-and-forth adjustment of the matrices, which can be connected to the first matrix or to the joined second and third matrices.

Functioning of the display takes place in the following manner. Information in the form of electrical digital signals, corresponding to a 2-dimensional representation of the $i^{th}$ aspect angle, is transmitted from the communications channel (arrival of the data) 1 to the buffered memory module 2, and then, in conformity with the synchronization, signals from the controller 3 appear at the component for display of 2-dimensional representations 4. The display component 4, in accordance with the electrical signals, forms a matrix array of parallel beams whose distribution of intensity corresponds to the distribution of intensity in the representation of the $i^{th}$ aspect angle. Then these beams, distributed as shown in FIG. 1 along dimension Z, illuminate the matrix 5 of scanning elements. This matrix consists of various elements as shown. Each micro-lens of the first matrix 6, optically joined to the display component, is illuminated by the corresponding beam. The beams, passing through the micro-lenses, are focused on the surface located at distance $F_1$ from the first matrix. In this manner, on this surface, representation of the ($i^{th}$) aspect angle appears as a matrix array of small dots of varying intensity and spaced at the dimensions of the micro-lenses of the first matrix. The diameter $d_1$ of these dots can be determined according to the formula:

$$d_1\{x,y\} \approx \lambda F_1/D_1\{x,y\},$$

where $\lambda$—wavelength of the radiation [beam],
$F_1$—focal length of the micro-lenses,
$D_1\{x,y\}$—size of the aperture of the micro-lenses of the first matrix.

Then the beams pass through the corresponding micro-lenses of the second 7 and third 8 matrices. These two matrices are tightly joined to each other, and the corresponding micro-lenses are co-axially aligned. The second matrix 7 is arranged in the focal plane of the first matrix of micro-lenses 6, i.e., at a distance of $F_1$ from it, and the third matrix 8—in the (background) focal plane of the second matrix 7 of micro-lenses, at a distance of $F_2$ from it. In addition, the second and third matrices are equipped with a mechanism 9 for back-and-forth adjustment, and their position can be changed with respect to the first matrix by movement in the plane in which they are located. In this way the beams formed by the display component 4 and representing the $i^{th}$ aspect angle of the object, passing through the matrix of scanning elements 5 consisting of matrices 6, 7 and 8, will present a matrix array of parallel beams 10, whose distribution (range) of intensity corresponds to the range of intensity in the representation of the $i^{th}$ aspect angle, and the angle of diffraction $\alpha_i$ from the optical axis of the micro-lenses of the third matrix depends on the relative movement of the matrices $\Delta_i\{x,y\}$ and equals:

$$\alpha_i\{x,y\} = arc\ tg\{\Delta_i\{x,y\}/F_2\}$$

Obviously, the maximum angle of diffraction $\alpha_0$ will be seen when $\Delta_i\{x,y\} = D_2\{x,y\}/2$, where $D_2\{x,y\}$ is the size of the apertures of the micro-lenses of the second matrix, and consequently the viewer (11) or viewers can see the aspect angles of a 3-dimensional object (or scene), i.e., they can see a volumetric stereo representation, in the angle of $$2\alpha_0\{x,y\} = 2arc\ tg\{D_2\{x,y\}/(2F_2)\}$$

An important condition affecting realization of the maximum number of aspect angles of a 3-dimensional object, and in turn providing the largest angle of view, is the number of focused dots provided by the matrix 6 of micro-lenses in the direction of movement of the matrices. The maximum number of aspect angles that can be provided (specifically in direction X) is equal to the aperture of the elements (micro-lenses) matrices in this direction, divided by the size of a focused dot, i.e., $$D_2\{x\}/d\{x\} = D_2\{x\}D_1\{x\}/\lambda F_1$$

To ensure the largest angle of view, to minimize the loss of light, and to decrease parasitic lighting, it is best to use three identical matrices of micro-lenses with as wide an aperture as possible.

Naturally, for each representation of an aspect angle of an object there must be a specific corresponding angle of diffraction, and consequently the tempo of the appearance of data at the digital input of the display component 4 must be synchronized with the speed of adjustment of matrices 7 and 8 using mechanism 9. These conditions are created using signals of the first positional sensor 12, which [signals] arrive at controller 3 and are used to generate synchronization signals, which in turn regulate the appearance of information from buffered memory 2 at the digital input of the display component of 2-dimensional representations 4.

The cycle of transmission of all (possible in a given system) aspect angles of a single frame of a 3-dimensional representation is accomplished using a summary (relative) movement of the matrices equal in range to the size of their elements, and then the cycle is repeated for the following frames.

Depending on whether it is necessary to transmit the full parallax, i.e., in both horizontal and vertical planes, the movement must be in both directions, and for this a two-coordinate mechanism must be used. At the same time, in most applications of stereo displays only the horizontal parallax is significantly limited, since the viewer's eyes are arranged horizontally and the absence of vertical parallax has little effect on display of volumetric effects. On the other hand, application of only the horizontal parallax simplifies and gives a more compact construction (adjustment mechanism, mechanics), simplifies the optics, and decreases the demand for high speed operation of the display component.

Figure 2:
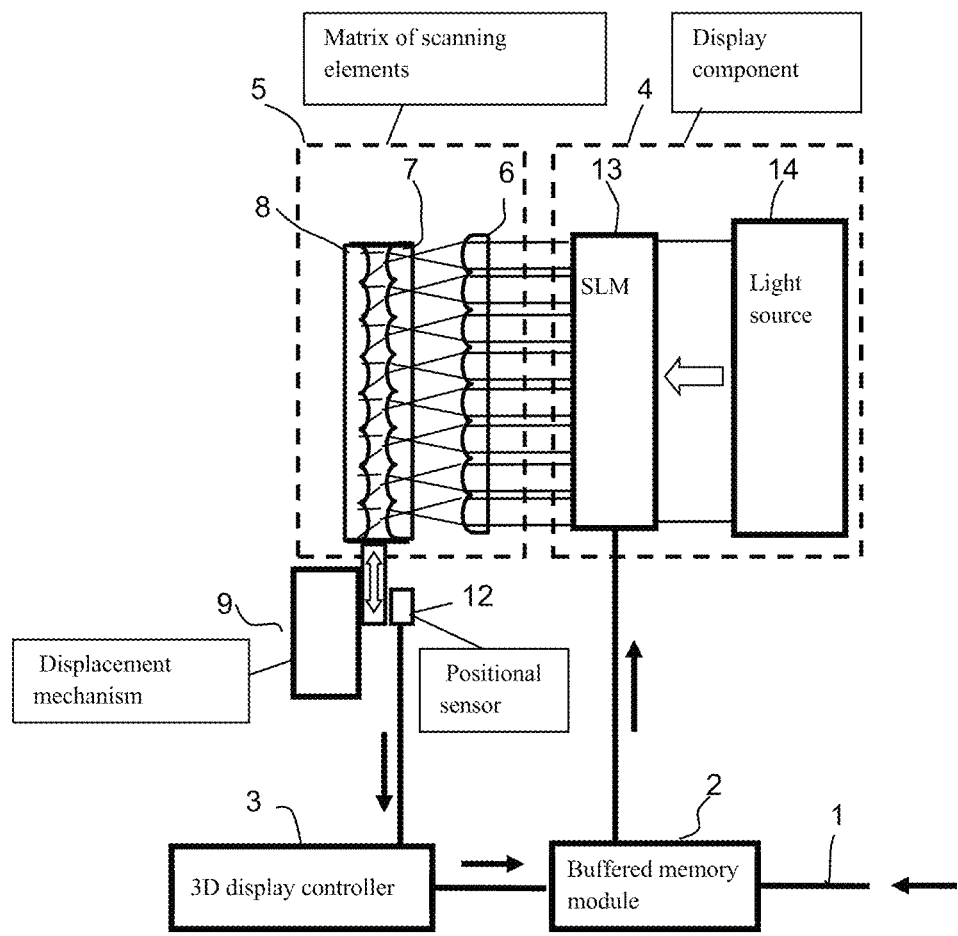
FIG. 2—an apparatus using an SLM and a light source.

FIG. 2 illustrates a common case, in which a type of matrix component for transforming electric signals into light, commonly available today, is used as the display component. This component consists of a transparent matrix space-time light modulator (SLM) 13 and a light source 14. The SLM can also be a reflective type based on liquid crystals, a matrix of micro-mirrors (MEMS technology) and other [components]. A matrix of LEDs or laser diodes can also be used as the display component and can include functions of a modulator and light source.

Figure 3:
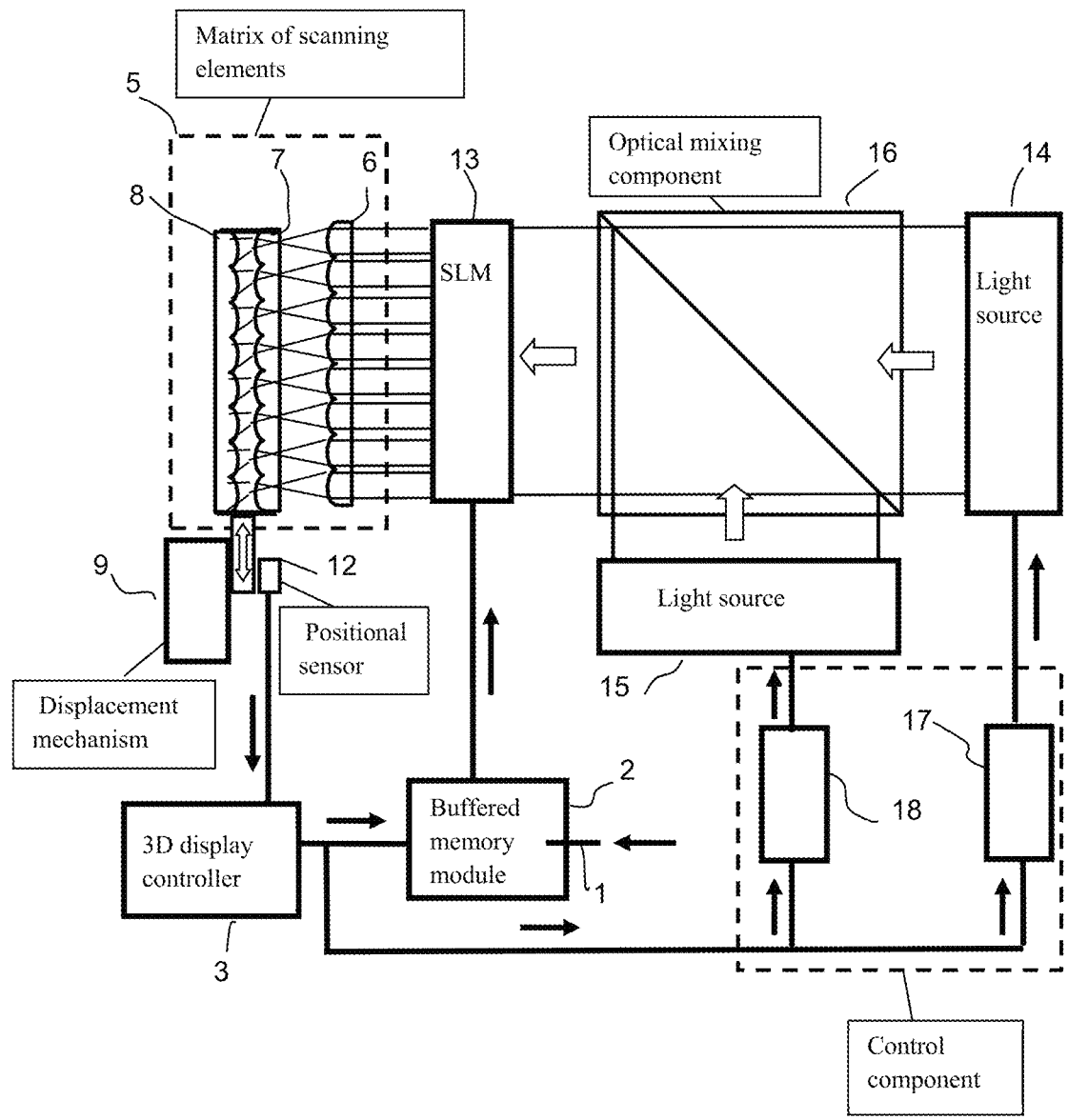
FIG. 3—a color apparatus using a single SLM.

The quality of a display is significantly increased by the ability to display color representation. To implement this ability there are two variants:

The first is use of a single SLM 13, which in turn is illuminated by various (for example, RGB) colors from a single (with changing color filters) or several light sources. FIG. 3 shows a variant with two sources of polarized light 14 and 15, the light from which is blended and sent to the SLM 13 using an optical component in the form of a polarized cube 16. The corresponding control component 17 and 18 enable alternating activation of the light sources depending on the color of the representation of the aspect angles, while the outputs of the control component are connected to the control input of the corresponding light source, and the synchronization input is connected to the output of controller 3.

Figure 4:
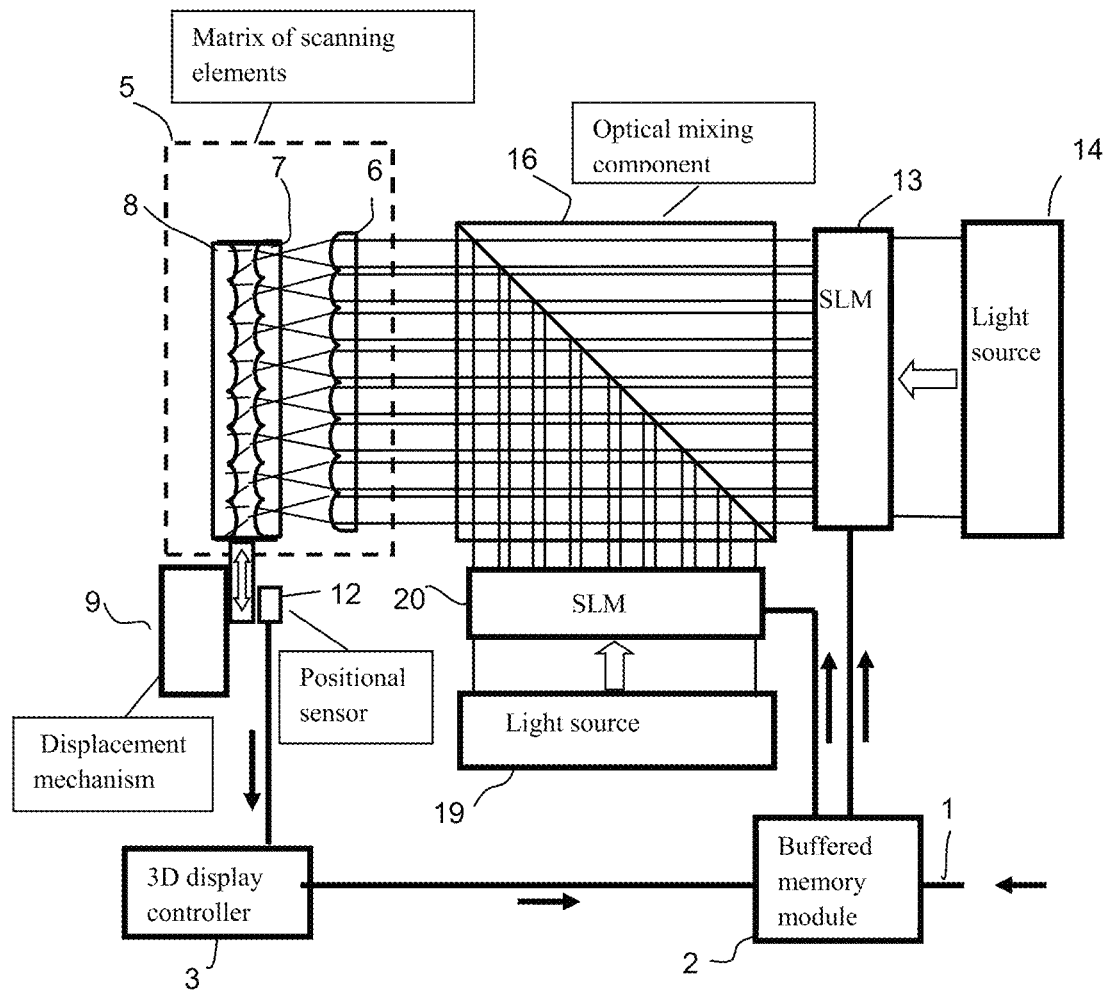
FIG. 4—a color apparatus using two SLMs.

The second variant is illustrated in FIG. 4. For projection of color representations of an object, the display component contains several light sources of different colors (in FIG. 4 two light sources 14 and 19 [sic; 20] are shown, for illumination of the corresponding SLMs 13 and 20 [sic; 12]). After passing through the SLMSs, the modulated beams are blended using the polarized cube 16 and directed to the first matrix of micro-lenses 6. Thus, in this scheme all color composite representations of a single aspect angle are transmitted simultaneously (in parallel), and the digital input of each modulator is connected to the corresponding digital output of the buffered memory module 3.

Figure 5:
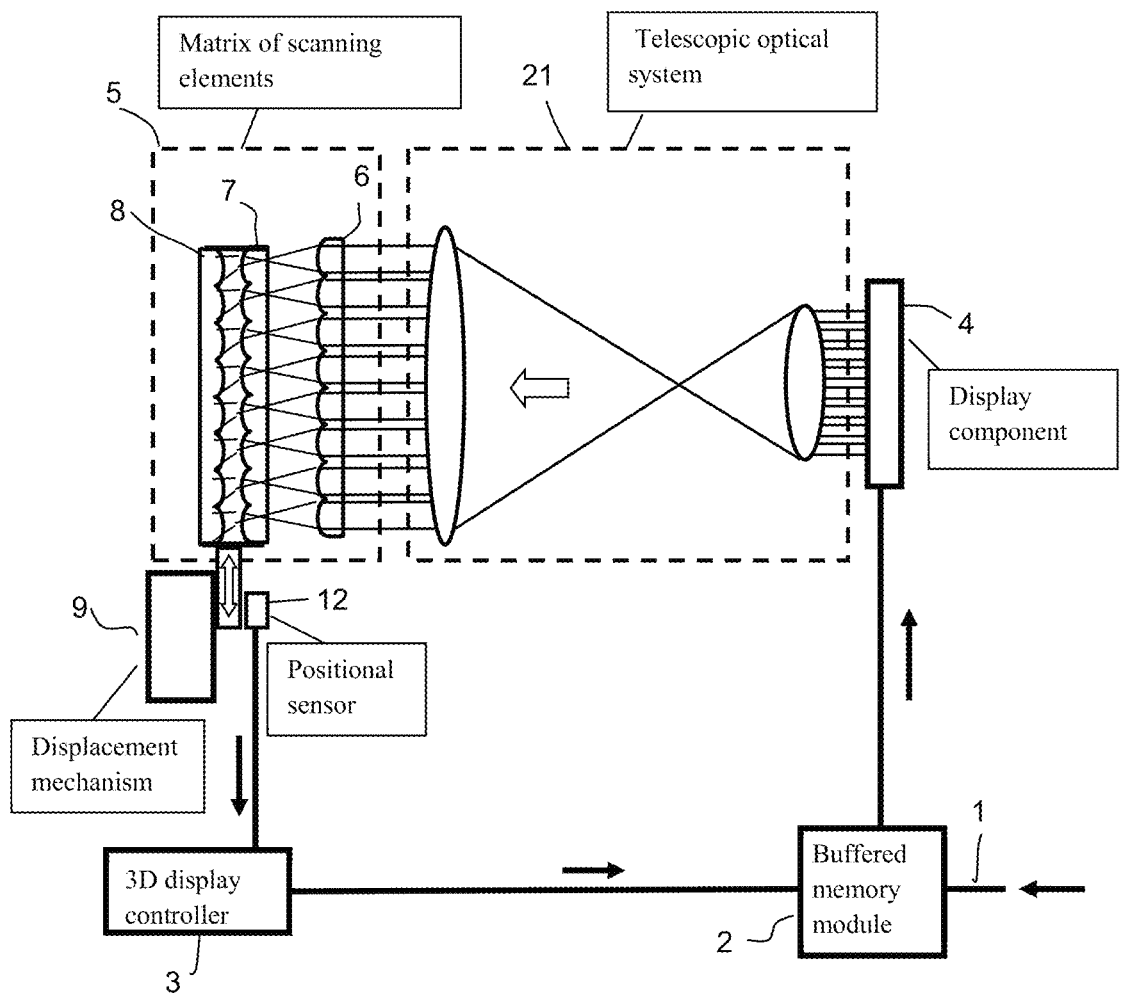
FIG. 5—an apparatus using a telescopic optical system.

FIG. 5 presents the diagram of a display in which a telescopic optical system 21 is used, which allows us to combine its necessary characteristics, in particular, high-speed operation, and the small dimensions for the display component for representation of aspect angles 3 with a screen (in this case with matrices of micro-lenses 6 and 7, 7 and 8) of large dimensions, and thus solve the problem of scaling the dimensions of the display screen.

Figure 6:
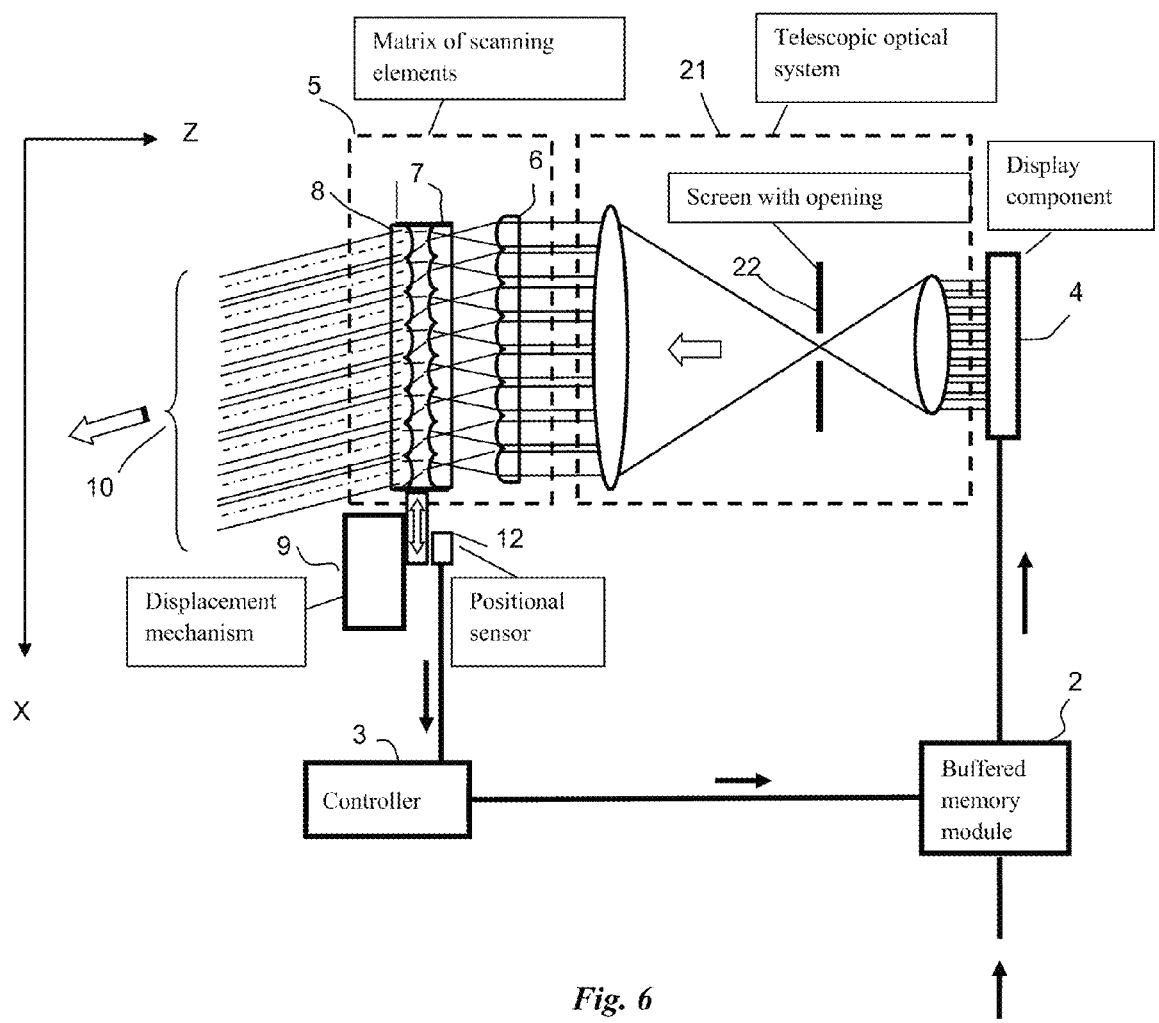
FIG. 6—an apparatus using a spatial filter.

FIG. 6 shows use of a spatial filter, in particular an opaque screen with an opening 22, in conjunction with a telescopic system 21. During operation of this system, due to the discrete character of the elements of the representation formed by the display component 4, and due also to the aberration of the optical system 21 and other elements, problems may arise with exact mixing of pictures of the representation aspect angles with the elements (micro-lenses) of the first matrix 6, which can lead to the appearance of noise (in the form of a moire picture) in the observed representation. This can be avoided, as shown in FIG. 6, by placing (in particular, in the optical system 21) a spatial filter 22 (an opaque screen with an opening) that "spreads" the discrete spots and eliminates the necessity of exact registration of the pictures of an aspect angle with the elements of the matrices. Moreover, mechanism 9, connected to the first matrix 6, can adjust this matrix during operation relative to the, in this case stationary, matrices 7 and 8. This means that stationary elements of the display will be shown to the viewer, which increases his comfort.

Figure 7:
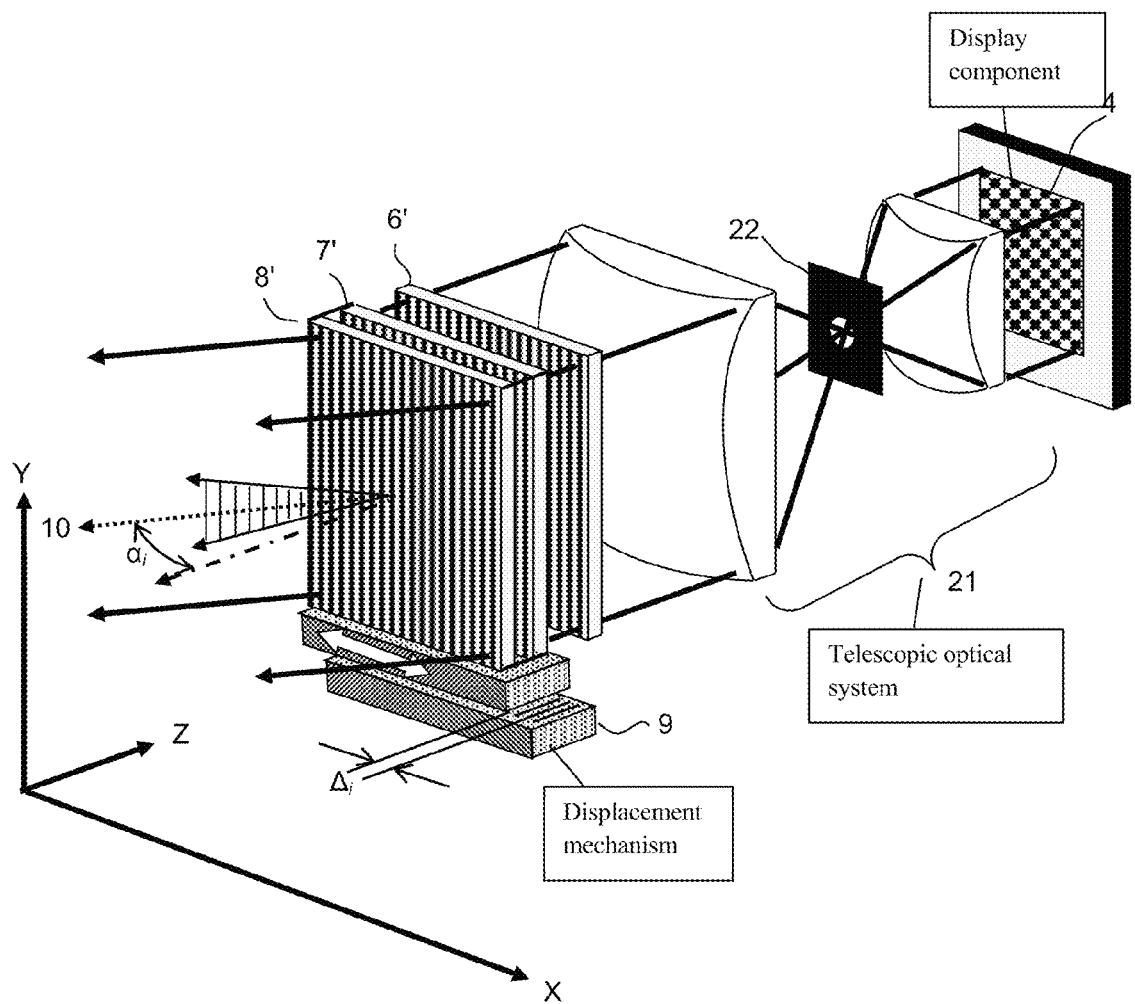
FIG. 7—an apparatus using lenticular matrices.

FIG. 7 illustrates a diagram for realization of horizontal parallax in which lenticular matrices 6*, 7* and 8* are used. Use of only horizontal parallax, as is well known, and as was shown above, only slightly decreases the sense of 3-dimensionality of the scene, but significantly simplifies the equipment, with respect both to construction and to requirements on the parameters of basic elements and assemblies.

Figure 8:
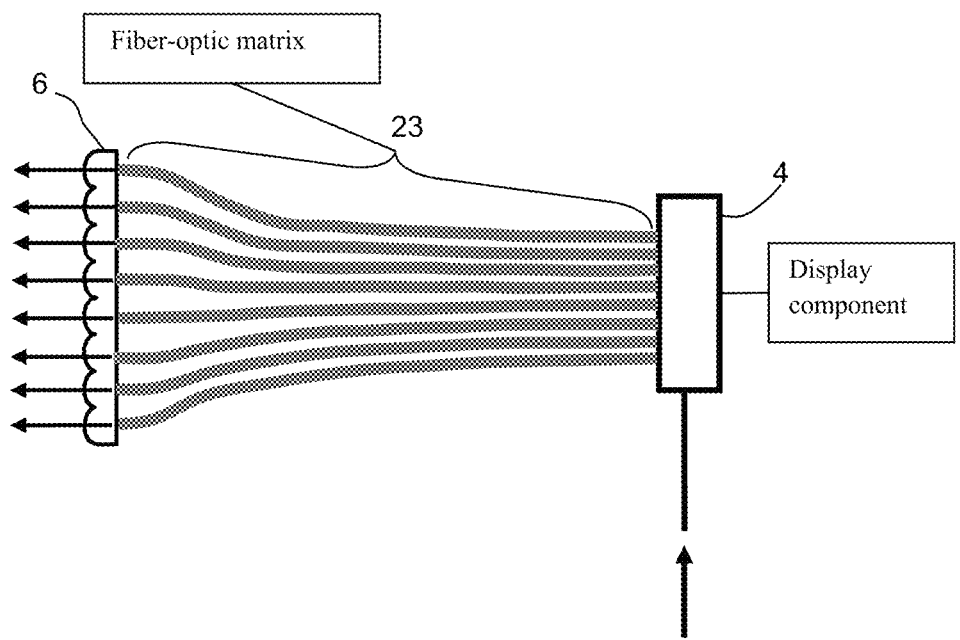
FIG. 8—an apparatus using a fiber-optic matrix.
Figure 9:
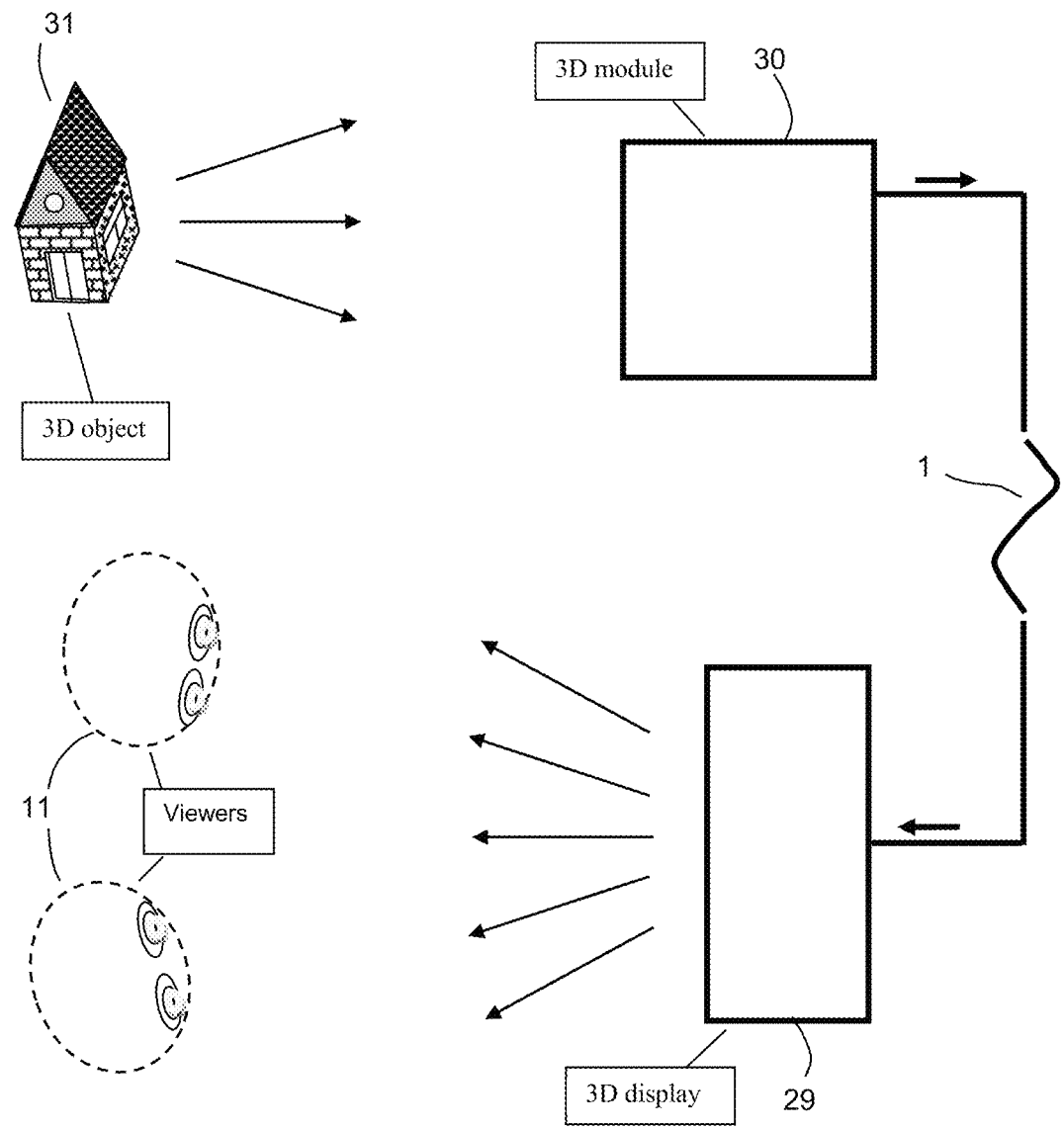
FIG. 9—the main diagram of a television stereoscopic system.

FIG. 8 shows a variant of joining the matrix 6 of micro-lenses and the display component 4, both having different scales (dimensions) using a fiber-optic gasket [sic] 23, which also allows us to decrease the dimensions and mass of the equipment.

A television stereoscopic system using a 3-dimensional stereoscopic display 29 works in the following manner. The module for forming signals of a 2-dimensional representation 30, whose digital outputs are connected to the digital inputs of the 3-dimensional display through the communications channel 1, receives light from a 3-dimensional object 31 or scene and produces electrical signals corresponding to the 2-dimensional representation of the aspect angles of the object. The transmitted signals are again transformed by the display 29 into a representation of the aspect angles of a 3-dimensional object and projected to viewers 11 and 11*.

Technology for producing data of the 2-dimensional aspect angles of 3-dimensional virtual objects using computers is relatively well known. Such data can be saved in the memory of a computer or specialized (memory) devices and later used by a 3-dimensional display. However, there is interest in producing such data for real objects (scenes) in order to save and transmit this data over communications channels (in particular television transmission) and to reproduce the 3-dimensional representation of objects on a 3-dimensional display. Moreover, it is understood that the component for producing the signals (data) must be capable of producing data that can be interpreted by the 3-dimensional display intended for reproduction of the representation.

In this invention this requirement is solved by using optical means to produce discrete focused images of the majority of aspect angles of a 3-dimensional object, subsequent isolation of separate (images) aspect angles, transmission of the representations of these images to a matrix photo-detector (photo-transformer), production of corresponding electrical signals and transmission (or recording) of these signals to a memory (or data storage) device, or transmission over communications channels (in particular, television transmission) to a 3-dimensional display.

Figure 10:
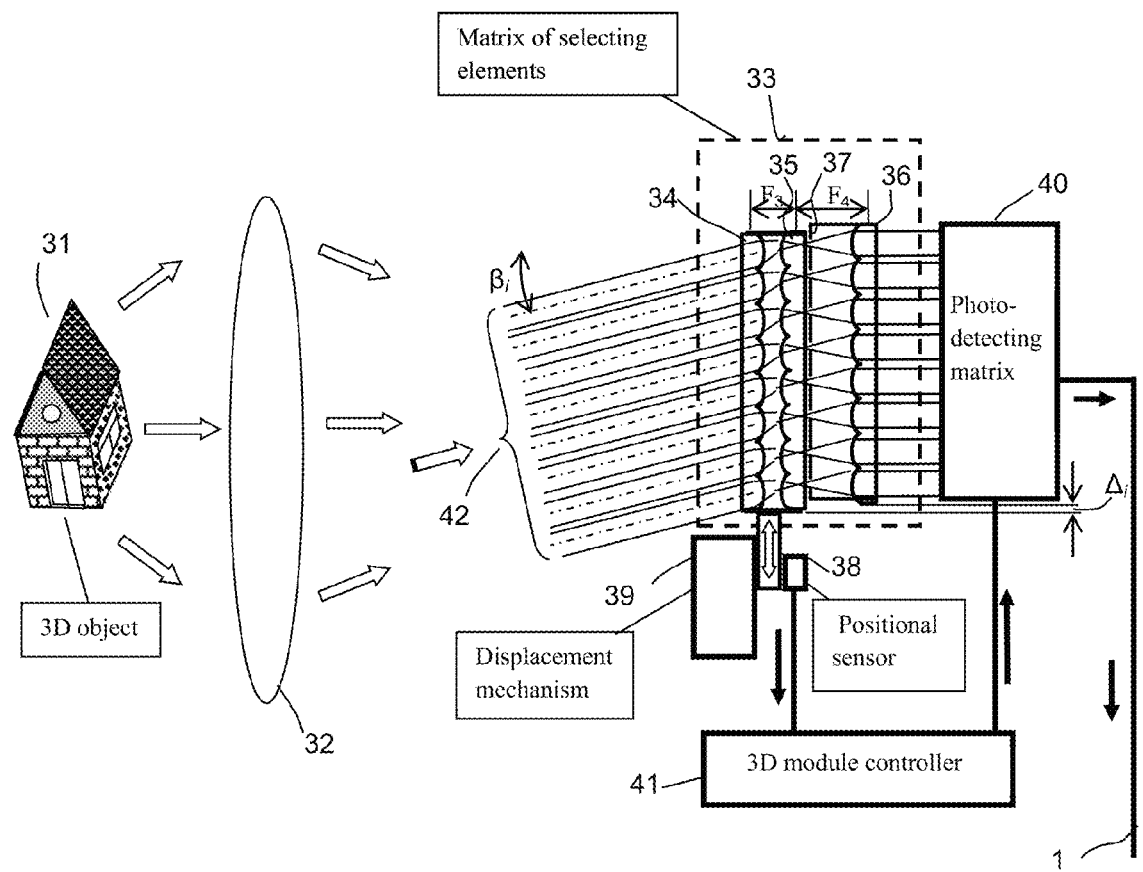
FIG. 10—the main diagram of a block for producing signals of a 2-dimensional images for a stereoscopic television system.

FIG. 10 shows a principal diagram of a module for production of signals of a 2-dimensional representation 30, of a television stereoscopic system. Light from object 31 passes through a gathering optical device (converging lens) 32 to a matrix of tuning elements 33, consisting of a receiving 2-dimensional matrix of receiving micro-lenses 34, analogous in number and relative position to the micro-lenses to the first matrix of micro-lenses 06 in FIG. 1, fourth 35 and fifth 2-dimensional matrices of micro-lenses and the multi-element spatial filter 37. The receiving matrix of micro-lenses 34 produces, in the focal plane (at distance $F_3$), the majority of aspect angles of the 3-dimensional object in the form of a representation consisting of focused dots, arranged with spacing identical to the spacing of the micro-lenses of the matrix. The dimensions of these dots equals $$d_3\{x,y\} \approx \lambda F_3 / D_3\{x,y\},$$

where $\lambda$ is the wavelength of the illumination, $F_3$ is the focal length of the micro-lenses of the receiving matrix, $D_3\{x,y\}$ is the aperture size of the micro-lenses of the receiving matrix.

Representations of aspect angles are moved relative to each other in the focal plane by the distance $d_3$. The fourth matrix 35 is tightly connected to the receiving matrix 34. The distance between them is equal to the focal distance $F_4$ of the micro-lenses of matrix 35. FIG. 10 shows a case where $F_4=F_3$. All optical axes of the beams passing through the micro-lenses of matrix 35 are parallel to each other and perpendicular to the surface of the matrices of micro-lenses.

The multi-element matrix spatial filter 37 is tightly connected to the fifth matrix 36, positioned in its foreground focal plane, and adjoins the fourth matrix 35. The matrix spatial filter 37 consists of (in the simplest variant) an opaque screen with openings of dimension $d_3$ spaced identically to the micro-lenses, because through these openings and then through the micro-lenses of matrix 36 pass beams corresponding to only one of the aspect angles. Tuning of the representation of specific aspect angles takes place by movement, controlled by the second positional sensor 38, of matrices 34 and 35, initiated by second back-and-forth adjustment mechanism 39.

The maximum number of aspect angles that can be tuned (in particular, in dimension X) is equal to the aperture of the elements (micro-lenses) of the matrices in this dimension, divided by the size of the focused dot, i.e., $$D_4\{x\}/d_3\{x\}=D_4\{x\}D_3\{x\}/\lambda F_3,$$

where $D_4\{x\}$ is the size of the aperture of the micro-lenses of the fourth matrix in dimension X.

The beams of a specific representation of an aspect angle selected (tuned) in this manner are then projected onto the appropriate region of the photosensitive surface of multi-element matrix photo-detecting component 40. At the same time, a synchronization signal, which serves to control the process of computation of the photo-detector and identification of the computed electrical signals with a specific representation of the aspect angles of a 3-dimensional object, is issued from the controller of composition module 41. The synchronization signal is also formed using data on the length of movement of the matrices of the corresponding angle $\beta_j$, under which the $j^{th}$ aspect angle 42 is viewed, and the angle of diffraction $\beta_j$, from the optical axes of the micro-lenses of the receiving matrix, depends on the relative movement of the matrices $\Delta_i\{x,y\}$ and is equal to:

$$\beta_j\{x,y\}=arc\,tg\{\Delta_j\{x,y\}/F_3\}.$$

From photo-detecting component 40, data in the form of electrical signals travel through the communications channel 01 to the 3-dimensional stereo display (or the data storage component).

Figure 11:
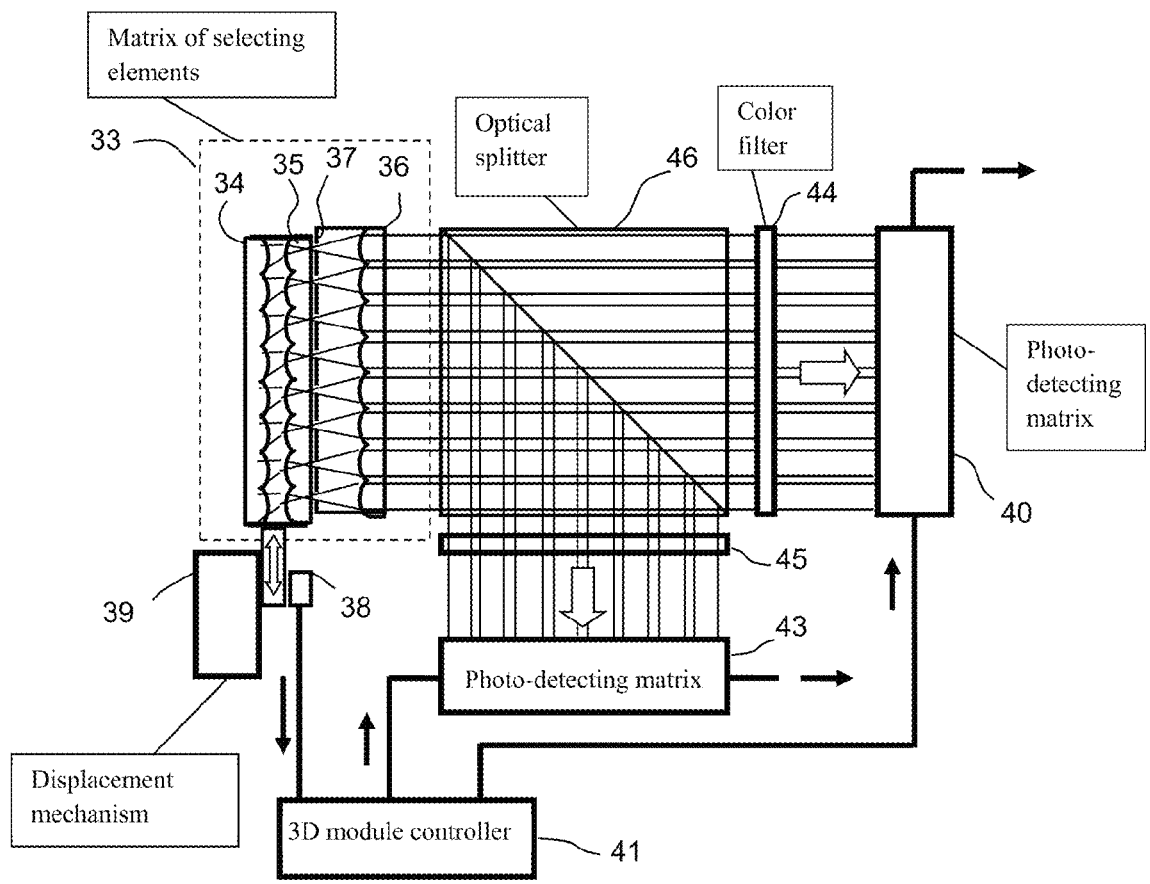
FIG. 11—a diagram of a block for producing signals of 2-dimensional images for a color 3-dimensional stereo TV.

Use of optical splitters and several photo-detecting components and color light filters can facilitate generation and transmission of signals for color representations, which allows us to display stereo representations. FIG. 11 shows a variant with two matrix photo-detecting components 40 and 43, on which are projected different colored representations of an aspect angle separated, respectively, by color filters 44 and 45. The original representation of the aspect angle is split into two identical representations using a splitting cube 46.

Figure 12:
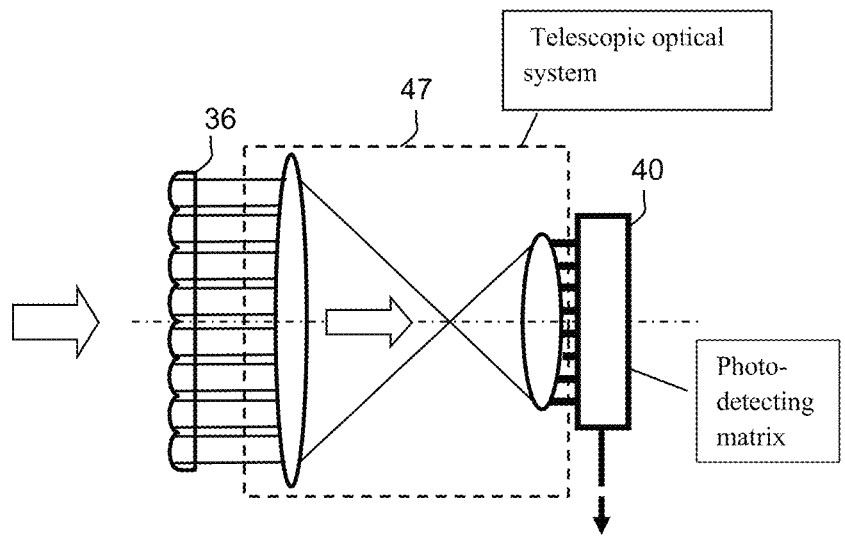
FIG. 12—a diagram of a block for producing signals of 2-dimensional images using a telescopic optical system.

FIG. 12 illustrates the use of a second telescopic optical system 47 for composition (joining) of different scales (dimensions) by a fifth matrix of micro-lenses 37 [sic; 36] and a photo-detecting component 40.

Figure 13:
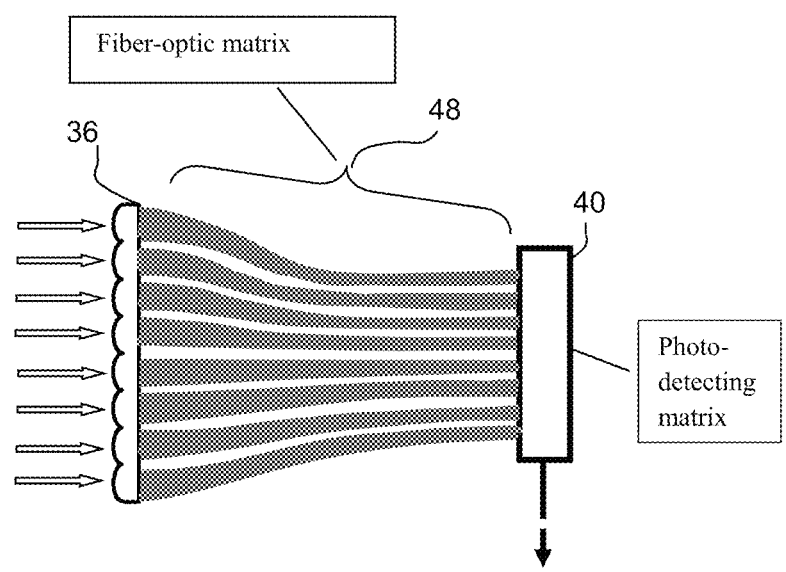
FIG. 13—a 3-dimensional stereo TV using a fiber-optic matrix.

FIG. 13 illustrates the use of a second fiber-optic matrix (48) for this same purpose and a second telescopic optical system.

Table 1 presents estimated parameters of a 3-dimensional stereo display, which can be built on the basis of the principles specified in this invention, and an analysis of the characteristics of its significant elements. (Data are given for a monochrome variant with horizontal parallax).

TABLE 1

| Display component (space-time light modulator based on liquid crystals) | |
| --- | --- |
| Number of elements (pixels) | 512 × 512 |
| Pixel spacing | 15 μm |
| Maximum frequency of changing frames, no less than | 7.5 кHz |
| Matrices (first, second and third matrix of micro-lenses) | |
| Spacing of the micro-lenses | 1 mm |
| Focal length of the micro-lenses | 2 mm |
| Screen of the display | |
| Area | 51 × 51 $CM^2$ |
| Demonstrated characteristics of the display | |
| Horizontal angle in which the object is observed | 28 deg. |
| Vertical angle in which the object is observed | 28 deg. |
| Number of aspect angles demonstrated in the horizontal plane | 300 |
| Number of aspect angles demonstrated in the vertical plane | 1 |
| Frequency of changing frames of the representation of an object | 25 $sec^{-1}$ |

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing description, and all changes that come within the meaning and range of equivalency of the claims are to be embraced within their scope.

What is claimed is:

1. A television system for producing a 3-dimensional representation of an object or scene, comprising:
    a 3-dimensional module (3D module) for selecting 2-dimensional representations of aspect angles of the 3-dimensional object or scene, transforming selected 2-dimensional representations into corresponding signals and transmitting said signals through a communications channel;
    a 3-dimensional display (3D display) for reproducing 2-dimensional representations of aspect angles of the 3-dimensional object or scene from said signals, wherein the 3D display is connected to the communications channel; and
    wherein the 3D display contains
    a module of buffered memory connected to the communications channel;
    a display component for 2-dimensional representations, wherein the display component is connected to the module of buffered memory;
    a first 2-dimensional matrix of converging micro-lenses, wherein each micro-lens is optically joined to a corresponding region of a display surface of the display component for 2-dimensional representations;
    second and third 2-dimensional matrices of micro-lenses, wherein the micro-lenses of the second and third matrices are coaxially aligned and connected to each other, and optically joined to the micro-lenses of the first matrix, and wherein the second matrix is positioned in the primary focal plane of the third matrix, and wherein the primary focal plane of the third matrix is matched with the back focal plane of the first matrix;

wherein a combination of the first, second and third matrices form a matrix of scanning elements for sequential projection of the 2-dimensional representations in the plane of their aspect angles so as to produce the 3-dimensional representation of the object or scene;

a first displacement mechanism for moving the position of the first matrix or the combined second and third matrices relative to each other in the plane in which they are positioned;

a first positional sensor for the moving matrix (matrices);

a 3D display controller for synchronizing each 2-dimensional representation with the corresponding position of the moving matrix (matrices) wherein the input of the 3D display controller is connected to the first positional sensor, and wherein the output of the 3D display controller is connected to the synchronization input of the module of buffered memory; and wherein the 3D module contains a receiving 2-dimensional matrix of converging micro-lenses;

a conversion lens for projection of 2-dimensional representations of the object or scene onto the receiving matrix of micro-lenses;

fourth and fifth 2-dimensional matrices of micro-lenses;

a multi-element spatial filter matrix; and at least one multi-element photo-detecting matrix for read-out selected 2-dimensional representations;

wherein a combination of the receiving, fourth and fifth matrices of micro-lenses and the multi-element spatial filter matrix form a matrix of selecting elements for sequential selecting 2-dimensional representations;

wherein the fourth matrix micro-lenses is rigidly connected to the receiving matrix and located in the back focal plane of the receiving matrix, and wherein micro-lenses of the fourth matrix are coaxially aligned with micro-lenses of the receiving matrix and optically joined to respective elements of the spatial filter matrix;

wherein the spatial filter matrix is adjoining the fourth matrix, rigidly connected to the fifth matrix and located in the primary focal plane of the fifth matrix, and wherein micro-lenses of the fifth matrix are coaxially aligned with respective elements of the spatial filter matrix and optically joined to corresponding regions of the photosensitive surface of the photo-detecting matrix;

a second displacement mechanism for moving the position of the combined receiving and fourth matrices or the combined the spatial filter matrix and the fifth matrix relative to each other in their respective planes in which they are positioned;

a second positional sensor for the moving combined matrices;

a 3D module controller for synchronizing readout of each 2-dimensional representation by said photo-detecting matrix with the corresponding position of the moving combined matrices wherein the input of the 3D module controller is connected to the second positional sensor, and wherein the output of the 3D module controller is connected to the synchronization input of said photo-detecting matrix.

2. The television system according to claim 1 wherein the display component for 2-dimensional representations contains a spatial light modulator (SLM) and at least two controlled light sources of different colors for illumination of the spatial light modulator through an optical component for mixing their light, and a control component for switching the light sources depending on the color of the representation of the aspect angles, and wherein each output of the control component is connected to the control input of the corresponding light source, and the synchronization input is connected to the 3D display controller output.

3. The television system according to claim 1 wherein the display component for 2-dimensional representations contains at least two spatial light modulators (SLMs) and at least two light sources of different colors each for illumination of the corresponding SLM, and wherein said SLM is optically joined to the first matrix through an optical mixing component, and wherein the input of each SLM is connected to the corresponding output of the module of buffered memory.

4. The television system according to claim 1 wherein the display component for 2-dimensional representation consists of a LED matrix.

5. The television system according to claim 1 wherein the display component for 2-dimensional representation consists of a laser matrix.

6. The television system according to claim 1 wherein the first matrix is implemented with the same spacing of micro-lenses as the second and third matrices of micro-lenses.

7. The television system according to claim 1 wherein the first, second and third matrices are composed of identical micro-lenses.

8. The television system according to claim 1 wherein the first, second and third matrices of micro-lenses are each implemented as a lenticular matrix of cylindrical, vertically aligned lenses, and wherein the first displacement mechanism is implemented as a mechanism for back-and-forth horizontal movement.

9. The television system according to claim 8 wherein the amplitude of movement does not exceed the corresponding spacing of micro-lenses.

10. The television system according to claim 1 wherein the first matrix of micro-lenses is optically joined to the display surface of the display component through a first telescopic optical system.

11. The television system according to claim 1 wherein each micro-lens of the first matrix is optically joined to the corresponding region of the display surface of the display component through the corresponding fiber of a first fiber-optic matrix.

12. The television system according to claim 1 wherein the 3D module contains at least two multi-element photo-detecting matrices, wherein each photo-detecting matrix transforms 2-dimensional representations of the corresponding color, and wherein micro-lenses of the fifth matrix are optically joined to the photosensitive surface of said photo-detecting matrix through an optical splitter and a corresponding color filter.

13. The television system according to claim 1 wherein micro-lenses of the fifth matrix are optically joined to the photosensitive surface of the photo-detecting matrix through a second telescopic optical system.

14. The television system according to claim 1 wherein each micro-lens of the fifth matrix is optically joined to the corresponding region of the photosensitive surface of the photo-detecting matrix through the corresponding fiber of a second fiber-optic matrix.

15. The television system according to claim 1 wherein the multi-element matrix spatial filter is implemented as an opaque screen with openings, and wherein each opening is located in the axis of the corresponding micro-lens of the fifth matrix.

* * * * *